: 3,526,695
United States Patent Office
Patented Sept. 1, 1970

3,526,695
CORRUGATION CONTROL OF HEAT RELAXED THERMOPLASTIC FILMS
Arthur W. Spencer, Rochester, N.Y., assignor to Eastman Kodak Company, Rochester, N.Y., a corporation of New Jersey
Filed Oct. 27, 1967, Ser. No. 678,735
Int. Cl. B29c 25/00
U.S. Cl. 264—346          9 Claims

ABSTRACT OF THE DISCLOSURE

In processes for manufacturing heat set, heat relaxed oriented thermoplastic films, the presence of longitudinal corrugation-type defects in the finished films is a significant problem. It has been discovered that such corrugations can be effectively minimized by passing the film over a series of closely spaced idler rolls both at the end of the final heated section of the processing apparatus and at least at the beginning of the section in which the film is cooled to below its second order transition temperature. Controlled cooling of the film while it is passed over the closely spaced idler rolls effectively irons out the corrugations.

---

Figure 1:
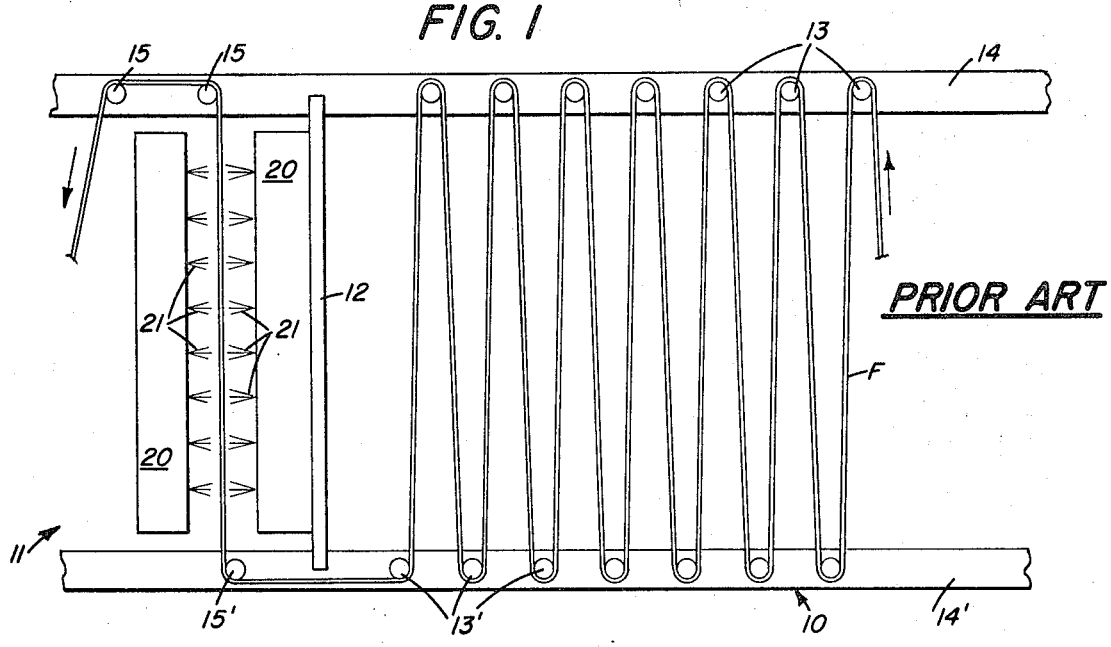

The present invention relates to the processing of thermoplastic film, and particularly to the elimination or control of defects therein known as longitudinal corrugations.

In the continuous preparation of thermoplastic films such as polyester films, cellulose ester films, polycarbonate films, polyvinyl films, polyolefin films, and the like, hot film, while it is gradually being cooled, is generally passed over a series of at least two idler rolls which are spaced apart so that the film has unsupported spans of from about 6 feet to about 8 feet in length. In the cooling section of the particular piece of equipment being utilized, generally one or more of these long, unsupported spans of hot film (initially at a temperature within the range in which the film is "limp," but below the melting point of the polymer) is passed between air plenum chambers from which blasts of relatively cool air are directed simultaneously at both sides of the film.

Films that can be directionally oriented and heat set [such as polyester, of which poly(ethylene terephthalate) and poly(cyclohexane 1,4-dimethylene terephthalate) are examples], are also conventionally subjected to a special heat treatment (subsequent to the "heat set" treatment), known in the art as a "heat relax" treatment or step. This subsequent, special "heat relax" treatment is differentiated from a "heat set" treatment by the fact that, while considerable tension is applied to the film during the "heat set" operation (such that the dimensions of the film are held substantially constant during the "heat set" treatment), the film is maintained under only a slight tension during the subsequent "heat relax" step (see, for example, details in U.S. Pat. 2,779,684). The use of a "heat relax" step in such overall continuous processes results in a still further improvement in the dimensional stability of the finished film.

This subsequent heat treatment (i.e., subsequent to the "heat set" operation) is also, conventionally followed immediately by a cooling treatment, whereby the film is moved through a cooling seution in order to fairly quickly lower its temperature to below the second order transition temperature of the film, so that the film is then in a condition suitable for further handling, including the winding of it onto rolls. Thus, in the continuous preparation of optionally dimensionally stable, oriented, heat relaxed thermoplastic film there is (1) a "heat relaxing" step (involving heating the film under only slight tension at a temperature slightly above the softening temperature of the film to improve its dimensional stability) and (2) a subsequent cooling step (whereby the temperature of the film is lowered to below its softening temperature fairly quickly).

These two steps are carried out in enclosed, usually adjacent, sections of conventional film machines. The sections will herein be termed, respectively, the "heat relax section" (or "heat relax air section") and the "cooling section" (or "cooling air section") in the order in which the film is passed through these sections during its manufacture.

While oriented, heat relaxed thermoplastic films such as polyester films can contain several forms of buckle, ripple, and longitudinal corrugation defects, I have found that one of the major types of this defect can be traced to corrugations created in the heat relax and cooling sections of the film making machine. The hot film in the heat relax air section gathers in ripples in the long unsupported spans separating idler rolls, and these defects are permanently set into the film as it is subsequently cooled to the temperature desired for further handling. These ripples eventually cause physical deformations. I have found that the degree of corrugations set into the film critically depends on the treatment given the film in the last stage(s) of the heat relax section and the early stage(s) of the cooling section.

The primary object of this invention is to eliminate, or control, the level of corrugation defect found in a thermoplastic, oriented, heat relaxed film, which defect results from passing the film through a final heat treatment and then immediately cooling the same.

Another object is to iron out any corrugations which tend to form in the film during the final stages of the last (heat relax) treatment and maintain the corrugations ironed out during the early stages of the cooling operation or until the film is set.

Figure 2:
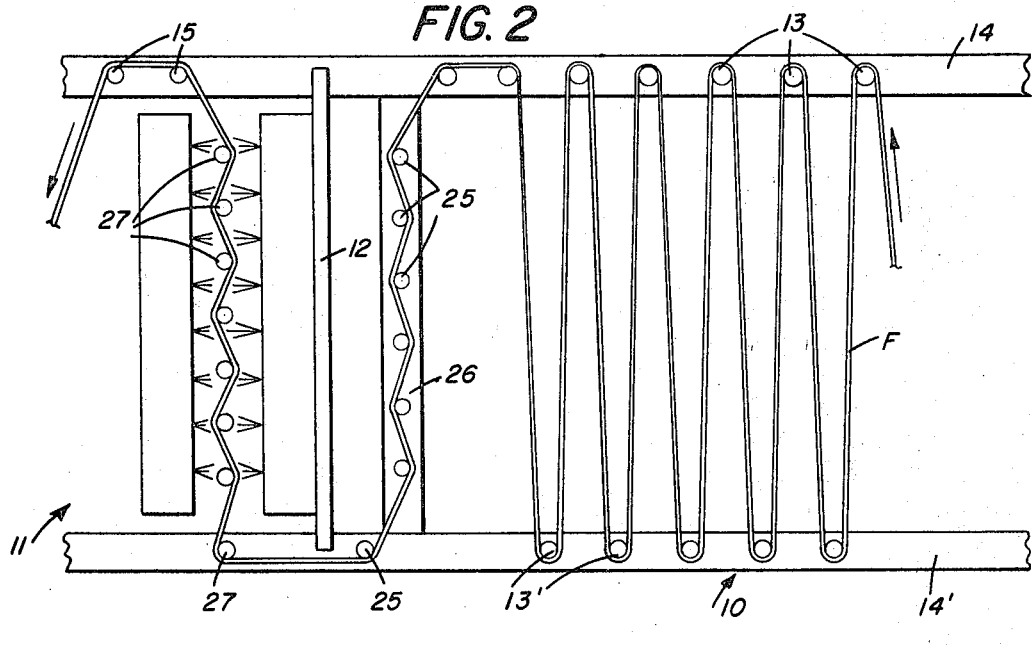

The novel features that I consider characteristic of my invention are set forth with particularity in the appended claims. The invention itself, however, both as to its organization and to its method of operation, together with additional objects and advantages thereof will best be understood from the following description when read in connection with the accompanying drawings in which:

FIG. 1 is a schematic view showing a conventional prior art film path used in the final heat relax and cooling sections of a polyester film making machine, and FIG. 2 is a schematic view similar to FIG. 1 and showing the film path modified according to the present invention.

Briefly stated, the objects of the present invention are accomplished by supporting the film in the last stage or stages of the heat treatment section and in the first stage or stages of the cooling section, and in its passage between the two, in such a way that there is no unsupported span of film which is over about 30 inches in length. The supports for the film, which may take the form of idler rolls, air bars, etc. extend transversely entirely across the width of the film and serve to iron out any corrugations which tend to form in the heat section and maintain the film in a smooth condition as it passes into and through the initial stages of the cooling section and is cooled to a temperature at which the film is set (i.e., to below its second order transition temperature).

Referring now to the drawings, in FIG. 1 there is schematically shown a conventional prior art roll arrangement for supporting a polyester film F as it is transported through the final heat treatment air section 10 and into the succeeding cooling air section 11, the two sections being separated by a partition 12. It should be understood that the film F before entering these last two treating sections 10 and 11 may have been oriented longitudinally, laterally, or both, before or after having been coated with a suitable substrata and heat treated one or more times to improve the dimensional stability of the film, dry the applied substrata, etc. by any suitable means well known in the art, not shown. While not illustrated for reasons of simplicity, each of the heat treatment air section 10 and the cooling air section 11 is suitably enclosed so that the desired temperature conditions can be maintained therein upon being obtained by suitable means, not shown. In the heat relax air section 10 the entering film F is guided and supported in an undulating path by a series of upper idler rolls 13 and lower idler rolls 13.' The idler rolls 13 and 13' extend completely across the film path to engage the full width of the film and are rotatably supported at opposite ends in pairs of upper and lower support bars 14 and 14', respectively, extending along opposite sides of the section.

Upon leaving the heat relax section 10 the film passes under partition 12 and over idler roller 15' where it is redirected vertically upward through the cooling air section 11 and over upper guide rolls 15. As the film moves upwardly upon entering the cooling air section 11, it passes between two air plenums 20 which are provided along their length with openings, not shown, through which streams of cool air issue and impinge upon the full width of the film as indicated at 21. In this prior art arrangement, the upper and lower idler or guide rolls in both the heat relax and cooling sections have been spaced apart by 6 feet to 8 feet so that the unsupported film spans in these sections have been 6 to 8 feet in length.

In the manufacture of polyester films, for example, temperature to which the film is subjected in the heat treatment section 10 may range from about 150° F. to about 400° F. depending upon the type of treatment the film has received prior to reaching this final heat treatment stage as well as the kind of polymer the film is made of. In the case of poly(ethylene terephthalate) film support, a final substrata curing temperature and/or an in-line process shrinkage, (heat relax) temperature used in this section causes the formation of objectionable corrugations when the film is subsequently air cooled to room temperature while passing over idler rolls with unsupported spans of 4 feet or more.. These corrugations usually take the form of continuous, longitudinal ripples or buckles on approximately ½ to 2 inch centers across the width of the film. In many cases, the corrugations on each half of the film are slightly angled toward the film center line. The outside 1 to 4 inches of the film frequently does not contain this corrugation defect. These undesirable defects are then set into the film as it is moved through the cooling section and its temperature dropped below the softening point of the polymer.

I have found that the degree of corrugation defect in thermoplastic film that is subject to this defect can be significantly reduced by ironing out any corrugations which might have been formed in the heat section just before the film leaves the heat section and is still pliable and then maintaining the corrugations ironed out during the passage of the film into and through at least the beginning of the cooling section up until the time it is cooled sufficiently to prevent any additional permanent defect formation (i.e., to at least several degrees below the second order transition temperature of the film). To obtain this ironing out action, it is necessary in the preferred practice of this invention to keep the unsupported spans of film in the last stage(s) of the heat section and the first stage(s) of the cooling section as well as in any reach of film between the two sections reduced to 30 inches or less.

In a process for the manufacture of thermoplastic sheeting characterized by at least one section of the processing machine where the web is heated to a temperature sufficient to be formable into longitudinal corrugations between idle rollers spaced wide apart regardless of the web tension applied, followed by one or more cool sections and the finished product windup in which the web is cooled below the temperature at which corrugations appear; the present invention involves the improvement comprising at least two idle rolls spaced 30" or less apart at the extreme end of the hot section and at least two idle rolls at the start of the first cool section spaced 30" or less apart in which the web cooling rate is controlled (40° F. or less in the case of polyester, for example) per idle roll in the cooling section until the web has reached the temperature at which corrugations do not form.

To this end the final heating and cooling sections of the prior art film making machine shown in FIG. 1 is modified as shown in FIG. 2 where corresponding parts are identified by the same reference characteristics. It will be noticed that according to the present invention the film is passed back and forth around a series of closely spaced idler rolls just before and during the cooling step from the warm treatment to the final film temperature. As shown in FIG. 2 the last reach of film F in the heat section 10 is passed back and forth over a plurality of closely spaced idler rolls 25 vertically spaced in "ladder" fashion along a support 26. Also in the first stage of the cooling section 11 the film is passed upwardly back and forth over a series of closely spaced idler rolls 27. If the idler rolls in each of these "ladder" roll arrangements are so closely spaced that any unsupported span of film in these reaches is held to less than 30 inches, it has been found that 50–90 percent of the corrugation defects produced by conventional equipment shown in FIG. 1 are eliminated. In this connection it is preferred that the lowermost guide roll 25 in the heat sections and the lowermost guide roll 27 in the cooling section should be so spaced with the idler rolls, if necessary so that the unsupported span between any of them is at most about 30 inches, also.

The series of idler rolls 25 in the heating section 10 tend to smooth or iron out any corrugations which might have been formed in the film prior to reaching them. At the same time, this "ladder" arrangement of idler rolls adequately supports the film in the last stage(s) of the heating section so as to prevent the formation of any additional corrugations which might otherwise be formed in this portion of the heat section. The "ladder" arrangement of idler rolls 27 in the cooling section, on the other hand, maintains the film smooth until it is sufficiently cooled such that permanent corrugations or other flatness irregularities will not form.

The degree of corrugation defect and the need for, and the amount of, control exercised by application of this invention is markedly dependent upon the thickness of the film being treated. Thinner films in the order of 2½ mils and less will form very severe corrugations and will actually require a multiplicity of closely spaced idler rolls and possibly embrace a relatively long length of film at the end of the heat section for correction of this defect. The defect will be less severe in films from 4 to 8 mils thick. This defect can, however, be significantly reduced by a fewer number of closely spaced supporting rolls applied within the prescribed processing areas. Thermoplastic film above 10 to 15 mils thick will generally not suffer this defect. This invention, can, of course, be applied to any thickness or type of polyester film since its use will not be detrimental even though it may be unnecessary.

While a "ladder" arrangement of idler rolls have been specifically disclosed for carrying out this invention, other means of supporting the film to the same end may be used. Also the direction of the "ladder" arrangement need not be vertical. For example, air bars (hollow stationary rods or shafts having holes along their length through which jets of air under pressure issue) could be arranged in a "ladder" arrangement in place of the idler rolls 25 and 27 for supporting the film on cushions of air. In order to insure optimum results with respect to the desired ironing out (to remove ripples formed in the film), the air streams of these air bars could be so arranged that the issuing jets of air would sweep the film from the center towards its edges.

The temperatures maintained in the heating section 10 and the cooling section 11 may vary from about 150° F. to about 400° F. and room temperature to about 150° F., respectively, depending upon the type of polymer the film is made from and the treatment which it has received prior to passing through the described final heating and cooling steps. In the case of poly(ethylene terephthalate) film supports where the final heat step is provided as a heat relax for the film which has been previously biaxially oriented and heat set under tension to improve its dimensional stability, the temperature used in the heat relax section 10 is generally in the order of about 250° F. (from about 190° F. to about 275° F.). While in the cooling section 11 the film is generally cooled to room temperature for further handling, the "ladder" arrangement of supporting rolls according to the present invention should extend from the entrance thereof to a point at which the film is cooled to below about 150° F. Thus, generally, in the practice of the present invention, the hot film is run over the closely spaced supporting elements of the present invention during a period of time in which the temperature of the surface of the film is reduced by at least about 75° F. (and preferably by at least about 100° F.) and within this temperature interval lies the so-called second order transition temperature of the film.

Although I have shown and described certain specific embodiments of my invention, I am fully aware that many modifications thereof are possible. My invention therefore is not to be limited to the precise details of construction shown and described but is intended to cover all modifications coming within the scope of the appended claims.

I claim:

1. In a process for manufacturing an oriented, heat set, heat relaxed thermoplastic resin film, which process comprises sequentially (a) passing oriented, heat set film in the form of a hot film through a heated, heat relax section in which (i) the temperature of said film is maintained above its second order transition temperature and (ii) while said film is supported between idler rolls in unsupported spans of at least about 4 feet in length, said film is held under very low tension for a period of time sufficient to thereby heat relax said film, and (b) passing the resulting heat relaxed film through a cooling section in which the temperature of said film is lowered to below said second order transition temperature; the improvement which comprises passing said hot film around a plurality of closely spaced idler rolls at both the end of said heated heat relax section adjacent to said cooling section and at the beginning of said cooling section, the unsupported film spans between said closely spaced idler rolls being at most about 30 inches and the temperature of said film being reduced to below said second order transition temperature while said film is being passed over said closely spaced idler rolls; the temperature of said film being reduced by at most about 40° F. while it passes between any two consecutive closely spaced idler rolls in said cooling section.

2. An improved process as in claim 1, wherein said oriented, heat set, heat relaxed thermoplastic resin is a polyester resin.

3. An improved process as in claim 2, wherein said polyester resin is poly(cyclohexane 1,4 - dimethylene terephthalate).

4. An improved process as in claim 2, wherein said polyester resin is poly(ethylene terephthalate).

5. An improved process as in claim 4, wherein the temperature of said film is reduced by at least about 75° F. while said film is passed over said closely spaced idler rolls.

6. An improved process as in claim 5, wherein the temperature of said hot film in said heated heat relax section is within the range of from about 190° F. to about 275° F. and wherein the temperature of said film is reduced to below about 150° F. while it is passed over said closely spaced idler rolls.

7. A process for removing longitudinal corrugations from an oriented, heat set, heat relaxed polyester film, which process comprises sequentially (a) passing oriented, heat set polyester film through a heated heat relax section in which the temperature of said film is maintained under very low tension above its second order transition temperature to thereby make a hot heat relaxed film; said film being supported while it is being heat relaxed between idler rolls in unsupported spans of at least about 4 feet in length, thereby causing said longitudinal corrugations to form; and (b) passing said hot heat relaxed film through a cooling section in which the temperature of said hot heat relaxed film is lowered by at least about 75 Fahrenheit degrees to below said second order transition temperature, said hot heat relaxed film being passed over a plurality of closely spaced idler rolls at both the end of said heated heat relax section adjacent to said cooling section and at least the beginning of said cooling section, the unsupported film spans between said closely spaced idler rolls being at most about 30 inches.

8. A process as in claim 7, wherein said polyester film is selected from the group consisting of poly(ethylene terephthalate) and poly(cyclohexane 1,4-dimethylene terephthalate).

9. A process as in claim 8, wherein the temperature of said hot heat relaxed film is reduced by at most about 40 Fahrenheit degrees while it passes between any two consecutive closely spaced idler rolls in said cooling section.

References Cited

UNITED STATES PATENTS

| | | | |
|---|---|---|---|
| 2,556,295 | 7/1947 | Pace | 18—48 |
| 2,627,088 | 2/1953 | Alles | 264—134 |
| 3,329,756 | 7/1967 | Seeley | 264—231 |

FOREIGN PATENTS

| | | |
|---|---|---|
| 230,915 | 12/1959 | Australia. |
| 247,499 | 12/1960 | Australia. |

ROBERT F. WHITE, Primary Examiner

R. R. KUCIA, Assistant Examiner

U.S. Cl. X.R.

264—210, 235, 288